(No Model.)  2 Sheets—Sheet 1.

G. W. DEITZLER.
APPARATUS FOR UTILIZING SOLAR HEAT.

No. 257,560.  Patented May 9, 1882.

Witnesses
Geo. H. Strong.
Frank A. Brooks

Inventor
George W. Deitzler
By Dewey & Co.
Attys

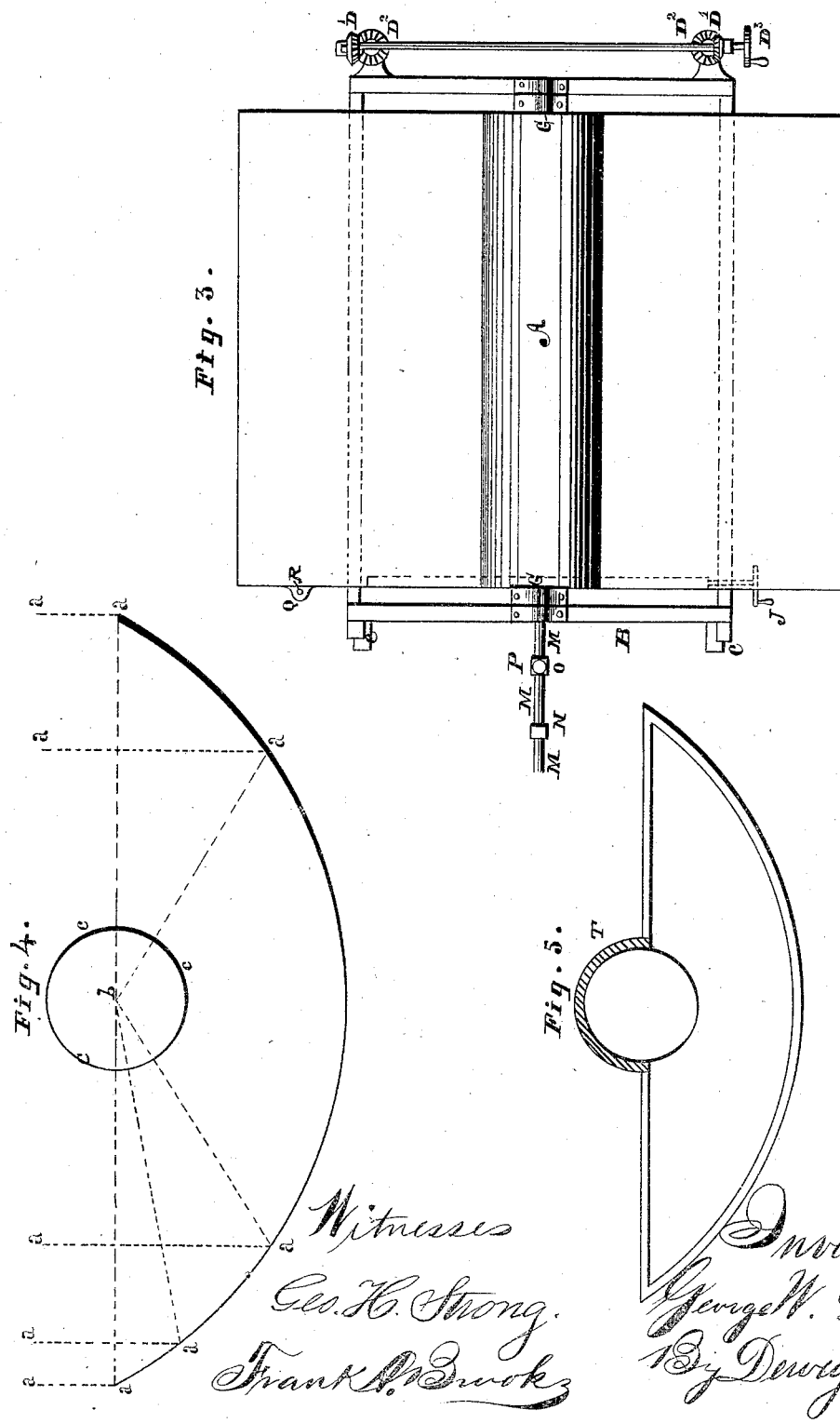

UNITED STATES PATENT OFFICE.

GEORGE W. DEITZLER, OF SAN FRANCISCO, CALIFORNIA.

APPARATUS FOR UTILIZING SOLAR HEAT.

SPECIFICATION forming part of Letters Patent No. 257,560, dated May 9, 1882.

Application filed August 12, 1881. (No model.)

*To all whom it may concern:*

Be it known that I, GEORGE W. DEITZLER, of the city and county of San Francisco, State of California, have invented certain new and useful Improvements in Apparatus for Utilizing Solar Heat, of which the following, taken in connection with the accompanying drawings, is a specification.

My invention relates to an improvement in apparatus for the collection, concentration, and utilization of the sun's heat for industrial purposes; and it consists essentially in the use of a cylindrical reflector, in combination with a cylindrical heat-receiver of novel construction and arrangement, and also in the arrangement and combination of devices that will be more fully described hereinafter, whereby the reflector and receiver can be set in the proper position and made to follow the direction of the sun's apparent movement, automatically or otherwise.

The machine herein described is designed more especially for the heating of a steam-boiler; but it is obvious that it can be applied to many other purposes where heat is required.

Figure 1:
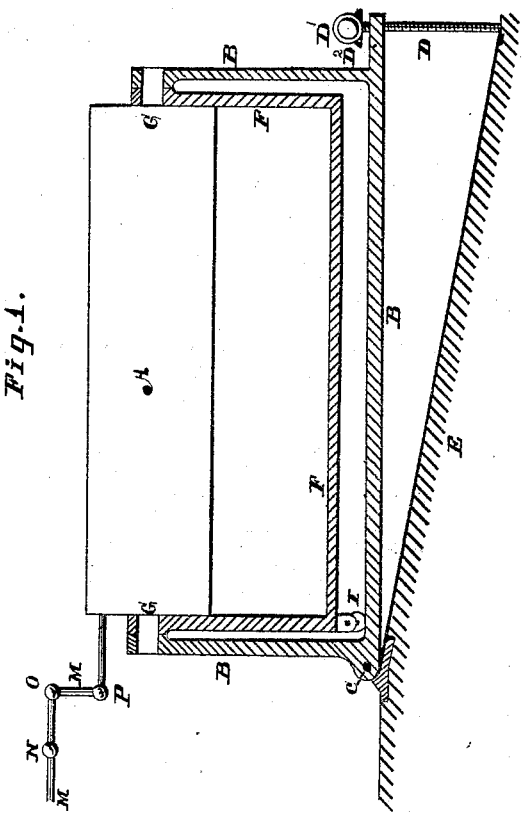
Figure 2:
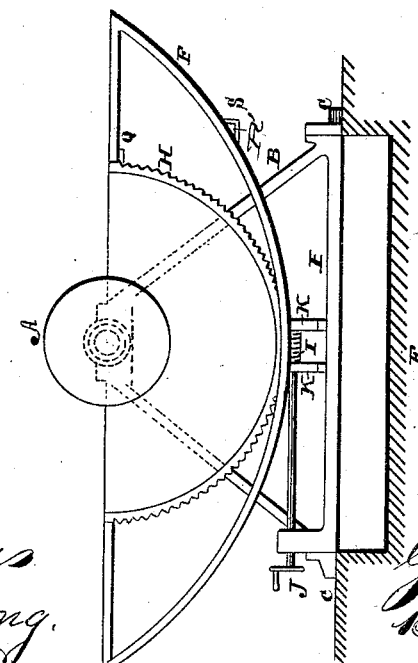

In the accompanying drawings, Figure 1 is a central longitudinal section. Fig. 2 is an end elevation. Fig. 3 is a plan view. Fig. 4 is a diagram illustrating the lines of incidence and reflection, the focus, and the curve of the reflector. Fig. 5 shows the jacket for the receiver.

A is the receiver, made of sheet metal or any other suitable material, with its outer surface blackened, and mounted on the frame B, to which it is fastened at each end. The frame B is placed above the foundation of the machine, and is attached to it at one end by means of the hinges C, and the other end is supported by the regulating-screws D, which screws are operated simultaneously by means of the gears D' D² and crank D³. This arrangement enables me to raise or depress the frame, and thus give the reflector and receiver the proper latitudinal inclination, according to the different solstitial angles in summer and winter.

E is the base of the machine.

The reflector F is a cylindrical surface of parabolic cross-section, mounted on the trunnion G, fastened to the frame B, and is caused to turn and follow the diurnal movement of the sun by means of the worm-gear H, screw I, and crank J. The worm-gear H is made fast to the reflector, and the screw is held in the bearings K, which bearings are bolted to the frame B. As shown in the drawings, the axis of the reflector is in the same line with the axis of the receiver or boiler. Thus constructed and arranged, the reflector and receiver are set at right angles with the plane of the sun's course.

M is the steam-pipe, connected with the boiler and any machinery to which it may be applicable by means of the three joints N O P.

Referring to Fig. 4, which shows more in detail the section of the reflector and boiler, the rays of the sun, $a$ $a$, striking the surface of the reflector at the proper angle, are reflected toward the focus $b$ and concentrated on the circumference of the boiler, which circumference has the focus $b$ for its center.

It is obvious that the quantity of heat arrested by or converged upon the circumference $c$ of the boiler, other things being equal, will be in proportion to the dimensions of the reflector, and also that the intensity or degree of heat on the circumference is greater as its circle is decreased. This, being true for any section of the reflector and receiver, is also true for the entire surface, and thus by using a cylindrical reflector of parabolic cross-section, in combination with a cylinder or boiler of circular cross-section, having the same axis as the reflector, and both placed horizontally, or nearly so, I am enabled to concentrate the rays of the sun evenly on the whole length of the boiler, and not in circular rings or spots, as it has been done before with cone-shaped or parabolic reflectors having surfaces of revolution, with the heat-receiver placed vertically, or, in other words, in the axis of the surface of revolution.

The apparatus is provided with an orienting device composed of two brackets, Q and S, Figs. 2 and 3, fastened to the reflector F, the object of which is to enable the operator to see that the reflector is at the proper angle with reference to image of the sun at all hours of the day.

In the center of the bracket Q is a small hole, R, and in the center of the bracket S is a cross, R'. The position of these brackets is such that a line drawn through the center of the hole R and through the cross R' will be at right angles with the geometrical plane forming the base of the parabolic surface of the reflector.

When in operation the reflector is caused to revolve, and is elevated or depressed by means of the devices heretofore described, and when the beams of sunlight passing through the hole R fall on the center of the cross R', the sun's rays strike the reflector at the proper angle for concentration on the receiver or boiler.

The foundation of the machine having been established, as described, so that the vertical plane passing through the axis of the heat-receiver is at right angles with the plane of the apparent course of the sun, the altitude is regulated by means of the screws D and crank $D^3$. This position varies with the seasons. In the annexed drawings it is made horizontal, as if the sun were at the zenith. The other or diurnal motion is given by means of the gear H, screw I, and crank J. It is changing every instant of the day with the apparent course of the sun. These different motions can be easily accomplished automatically by astronomical clocks, or by other suitable devices, which are well known and need not be further explained here.

I wish it to be understood that I do not restrict myself to the particular construction and combination of parts which compose the apparatus, for these may be varied to suit special conditions, so long as the apparatus, as a whole, is adapted to carry out the operations herein specified.

It will be understood now that when the machine is in operation the rays of heat will be concentrated upon that part of the boiler facing the reflector, and that the temperature of the water inside of the boiler will rise until steam is emitted, which steam can be led where desired by means of the pipes M and joints N O P.

I have provided the boiler with a detachable non-conducting jacket, T, as shown in Fig. 5. This jacket covers only that portion of the boiler which is not exposed to the concentrated heat-rays, and is fastened to the reflector F, so as to revolve with it. I can thus diminish the radiation without the use of a glass jacket, although in some cases it may be advantageous to use a glass jacket, as has heretofore been done.

It is not necessary, in order to carry out the purposes of my invention, to give to the reflector the parabolic shape. Other curves will do as well, provided the shape of the heat receiver is so devised and arranged as to receive the concentrated rays normally to its surface; and it is also obvious that the boiler here shown can be replaced by an air-heater, distilling apparatus, or any other vessel suited for some special purpose, without changing the principle of my invention.

By this arrangement—i.e., constructing a reflector having a parabolic or other cross-section, and placing the lines of the reflecting-surfaces parallel to the axis of the boiler or heat-receiver, which is the essence of my improvement—I am enabled to expose to the sun long and broad surfaces of reflection within reasonable limits and workable conditions, the length and breadth of the reflector being limited only by the convenience of construction and heat tubes or boilers of great length, the heat-rays being concentrated on the surfaces to be heated in long lines and with great evenness, each section of the boiler exposed receiving the same quantity of heat, whereas the reflectors heretofore used for such purposes, being all of the inverted pyramid or cone style, allow or permit only short and narrow surfaces of reflection, and gather the heat-rays on the receiver in concentric rings or spots—a process necessarily quite limited in its practical application.

The apparatus herein shown being horizontal, or nearly so, both ends of the receiver or boiler are readily accessible, and are easily connected with other mechanical devices—as, for instance, a steam-engine.

I am aware that reflectors have been used in combination with heat-receivers by Monchot, Ericsson, and others; but all such reflectors that have come under my observation were in the shape of inverted cones or pyramids, or parabolic surfaces of revolution, concentrating the sun's rays in circular rings, which system gives only limited surfaces to the reflector and heat-receiver, and consequently can be used only on a small scale, and such arrangement I do not broadly claim, as it is essential to the proper construction and successful operation of my invention that the reflector and heat-receiver shall be constructed and arranged as hereinbefore described, which combination and arrangement allows much larger surfaces and secures an even distribution of the heat, and acts on the boiler very much like the flame of the furnace, which is made to come in contact with the entire length of the under part of the steam-boiler.

I do not claim anything shown or described in the inventions of M. Monchot or Ericsson; but

What I claim as new, and wish to secure by Letters Patent, is—

1. The combination of a reflector of the described shape with a heat-receiver of substantially cylindrical form, and mounted and adjusted upon the focal line of the reflector.

2. The combination of the parallel and cylindrical reflector F and heat-receiver A with the regulating devices composed of the screws D' D'', crank $D^3$, hinges c, frame B, trunnion G, gear H, screw I, crank J, base E, orienting-bracket Q S, or other equivalent.

3. The combination of the jacket T, made of non-conducting material, with the heat-receiver A and reflector F.

4. The improved apparatus for concentrating and applying the heat-rays of the sun, consisting of a mirror straight in longitudinal direction, and of parabolic or equivalent curve in cross-section, adapted to concentrate the heat of the sun-rays on a focal line, in combination with the heat-receiver mounted on the axis of the mirror.

In witness whereof I have hereunto set my hand.

GEO. W. DEITZLER.

Witnesses:
WM. S. CAMPBELL,
ALBT. MCALESTER.